(12) United States Patent
Sarawate et al.

(10) Patent No.: US 9,995,160 B2
(45) Date of Patent: Jun. 12, 2018

(54) AIRFOIL PROFILE-SHAPED SEALS AND TURBINE COMPONENTS EMPLOYING SAME

(71) Applicant: General Electric Company, Schenectady, NY (US)

(72) Inventors: Neelesh Nandkumar Sarawate, Niskayuna, NY (US); Kirk D. Gallier, Liberty Township, OH (US); Robert Frederick, West Chester, OH (US); Darrell Senile, Oxford, OH (US); Benjamin Huizenga, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 749 days.

(21) Appl. No.: 14/578,816

(22) Filed: Dec. 22, 2014

(65) Prior Publication Data

US 2016/0177757 A1     Jun. 23, 2016

(51) Int. Cl.
*F01D 9/02*    (2006.01)
*F01D 9/06*    (2006.01)
*F01D 11/00*   (2006.01)
*F01D 25/16*   (2006.01)
*F01D 5/28*    (2006.01)

(52) U.S. Cl.
CPC ............ *F01D 9/065* (2013.01); *F01D 11/005* (2013.01); *F01D 25/162* (2013.01); *F01D 5/282* (2013.01); *F01D 5/284* (2013.01); *F05D 2300/6033* (2013.01); *Y02T 50/672* (2013.01)

(58) Field of Classification Search
CPC . F01D 9/023; F01D 9/41; F01D 9/065; F01D 11/005; F01D 25/62
See application file for complete search history.

(56) References Cited

U.S. PATENT DOCUMENTS

| 3,269,700 | A  | 8/1966  | Shainess        |
| 6,375,429 | B1 | 4/2002  | Halila et al.   |
| 6,464,456 | B2 | 10/2002 | Darolia et al.  |

(Continued)

FOREIGN PATENT DOCUMENTS

WO     2013013975 A1     1/2013

OTHER PUBLICATIONS

Sarawate et al., Pending Utility U.S. Appl. No. 13/560,357, filed Jul. 27, 2012, entitled Layering Seal for Turbomachinery.

*Primary Examiner* — Woody Lee, Jr.
*Assistant Examiner* — Maxime Adjagbe
(74) *Attorney, Agent, or Firm* — GE Global Patent Operation; John Darling

(57) ABSTRACT

An airfoil profile-shaped seal is disposable between an inside surface of a hollow airfoil body and a seal support. The seal includes an elongated member defining a generally closed curve having a generally straight portion, a generally curved portion, and having a solid cross-section across and along the length of the elongated member. When the seal is disposed in an airfoil profile-shaped groove of a seal support adjacent to the inner surface of the hollow airfoil body, and a fluid pressure on one side of the seal is greater than a fluid pressure on the other side of the seal, portions of the seal engage the inner surface of the hollow airfoil body and a surface of the groove to form a seal to inhibit leakage of fluid from the one side to the other side.

23 Claims, 10 Drawing Sheets

(56) References Cited

U.S. PATENT DOCUMENTS

| | | |
|---|---|---|
| 7,452,182 B2 | 11/2008 | Vance et al. |
| 7,452,189 B2 * | 11/2008 | Shi .................. F01D 5/147 415/200 |
| 7,581,924 B2 | 9/2009 | Marini et al. |
| 7,762,761 B2 | 7/2010 | Busch et al. |
| 8,225,614 B2 | 7/2012 | Lacy et al. |
| 8,292,580 B2 | 10/2012 | Schiavo et al. |
| 8,398,359 B2 | 3/2013 | Gallier et al. |
| 8,439,643 B2 | 5/2013 | Kuhne et al. |
| 8,454,303 B2 | 6/2013 | Garcia-Crespo |
| 8,469,656 B1 | 6/2013 | Diakunchak |
| 8,613,451 B2 | 12/2013 | Samudrala et al. |
| 8,689,619 B2 | 4/2014 | Spandl et al. |
| 8,777,563 B2 | 7/2014 | Sarawate et al. |
| 8,777,583 B2 | 7/2014 | Darkins, Jr. et al. |
| 2001/0019695 A1 | 9/2001 | Correia |
| 2009/0193657 A1 | 8/2009 | Wilson, Jr. et al. |
| 2012/0085103 A1 | 4/2012 | Lacy et al. |
| 2012/0119447 A1 | 5/2012 | Demiroglu et al. |
| 2012/0119449 A1 | 5/2012 | Demiroglu et al. |
| 2012/0133102 A1 | 5/2012 | Samudrala et al. |
| 2012/0183393 A1 | 7/2012 | Demiroglu et al. |
| 2012/0195741 A1 | 8/2012 | Sarawate et al. |
| 2013/0106066 A1 | 5/2013 | Sarawate et al. |
| 2013/0108418 A1 | 5/2013 | Morgan et al. |
| 2013/0108420 A1 | 5/2013 | Morgan et al. |
| 2013/0134678 A1 | 5/2013 | Sarawate et al. |
| 2013/0161914 A1 | 6/2013 | Sarawate et al. |
| 2013/0205800 A1 * | 8/2013 | Ivakitch .................. F01D 9/042 60/805 |
| 2014/0062024 A1 | 3/2014 | Bidkar et al. |
| 2014/0062032 A1 | 3/2014 | Wolfe et al. |
| 2014/0062034 A1 | 3/2014 | Lacy et al. |
| 2014/0090457 A1 | 4/2014 | Snider et al. |
| 2014/0154062 A1 | 6/2014 | Weber et al. |
| 2015/0016971 A1 | 1/2015 | Freeman et al. |

\* cited by examiner

AIRFOIL PROFILE-SHAPED SEALS AND TURBINE COMPONENTS EMPLOYING SAME

TECHNICAL FIELD

The present disclosure relates generally to sealing structures in turbomachinery, and in particular to airfoil profile-shaped seals for reducing leakage, for example, between adjacent stationary airfoil shaped components of turbine nozzles.

BACKGROUND

Generally, turbomachinery such as gas turbine engines and the like includes a main gas flow path therethrough. The main gas flow path generally includes a gas intake, a compressor, a combustor, a turbine, and a gas outlet.

Gas turbine nozzles are static components of a gas turbine configured to direct heated gas in a hot gas path to the rotating buckets or vanes of the turbine. In turbomachinery such as aircraft engines, a secondary air flow path is extracted from later stages of the compressor and fed into the nozzles and buckets of the turbine. The purpose of this air is to keep the hot gas path components at a safe temperature, as well as pressurize the low-temperature capable components that are not in the primary flowpath. This secondary air flow does not contribute directly to work done by the turbine and excess leakage of this flow is desirably avoided.

There is a need for further sealing structures in turbomachinery, and in particular to airfoil profile-shaped seals for reducing leakage, for example, between adjacent stationary airfoil shaped components of turbine nozzles.

SUMMARY

The present disclosure provides, in a first aspect, an article which includes a hollow airfoil body, at least one seal support, and an airfoil profile-shaped seal. The hollow airfoil body includes an outer surface and an inner surface defining a cavity therein. The at least one seal support having an airfoil profile-shaped groove with an outer opening disposed in said cavity adjacent to the inner surface of the hollow airfoil body. The airfoil profile-shaped seal is disposed in the groove of the seal support. The seal includes an elongated member defining a generally closed curve having a generally straight portion, a generally curved portion, and having a solid cross-section across and along the length of the elongated member. When a fluid pressure on one side of the seal is greater than a fluid pressure on the other side of the seal, portions of the seal engage the inner surface of the hollow airfoil body to form a seal to inhibit leakage of fluid from the one side to the other side.

The present disclosure provides, in a second aspect, an airfoil profile-shaped seal disposable between an inside surface of a hollow airfoil body and a seal support. The seal includes an elongated member defining a generally closed curve having a generally straight portion, a generally curved portion, and having a solid cross-section across and along the length of the elongated member. When the seal is disposed in an airfoil profile-shaped groove of a seal support adjacent to the inner surface of the hollow airfoil body, and a fluid pressure on one side of the seal is greater than a fluid pressurize on the other side of the seal, portions of the seal engage the inner surface of the hollow airfoil body and a surface of the groove to form a seal to inhibit leakage of fluid from the one side to the other side.

The present disclosure provides, in a third aspect, a method for sealing a hollow airfoil body to a seal support. The method include providing an airfoil profile-shaped seal including an elongated member having a generally solid cross-section across and along the length of the elongated member disposed in an airfoil profile-shaped groove of the seal support having an outer opening disposed adjacent to an inner surface of the hollow airfoil body, pressurizing a fluid on a first side of the seal support, and engaging the seal with the inner surface of the hollow airfoil body and a surface of the groove to form a seal to inhibit leakage of the fluid from the one side of the seal to the other side of the seal.

DRAWINGS

The foregoing and other features, aspects and advantages of this disclosure will become apparent from the following detailed description of the various aspects of the disclosure taken in conjunction with the accompanying drawings, wherein.

DETAILED DESCRIPTION

The detailed description facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Figure 1:
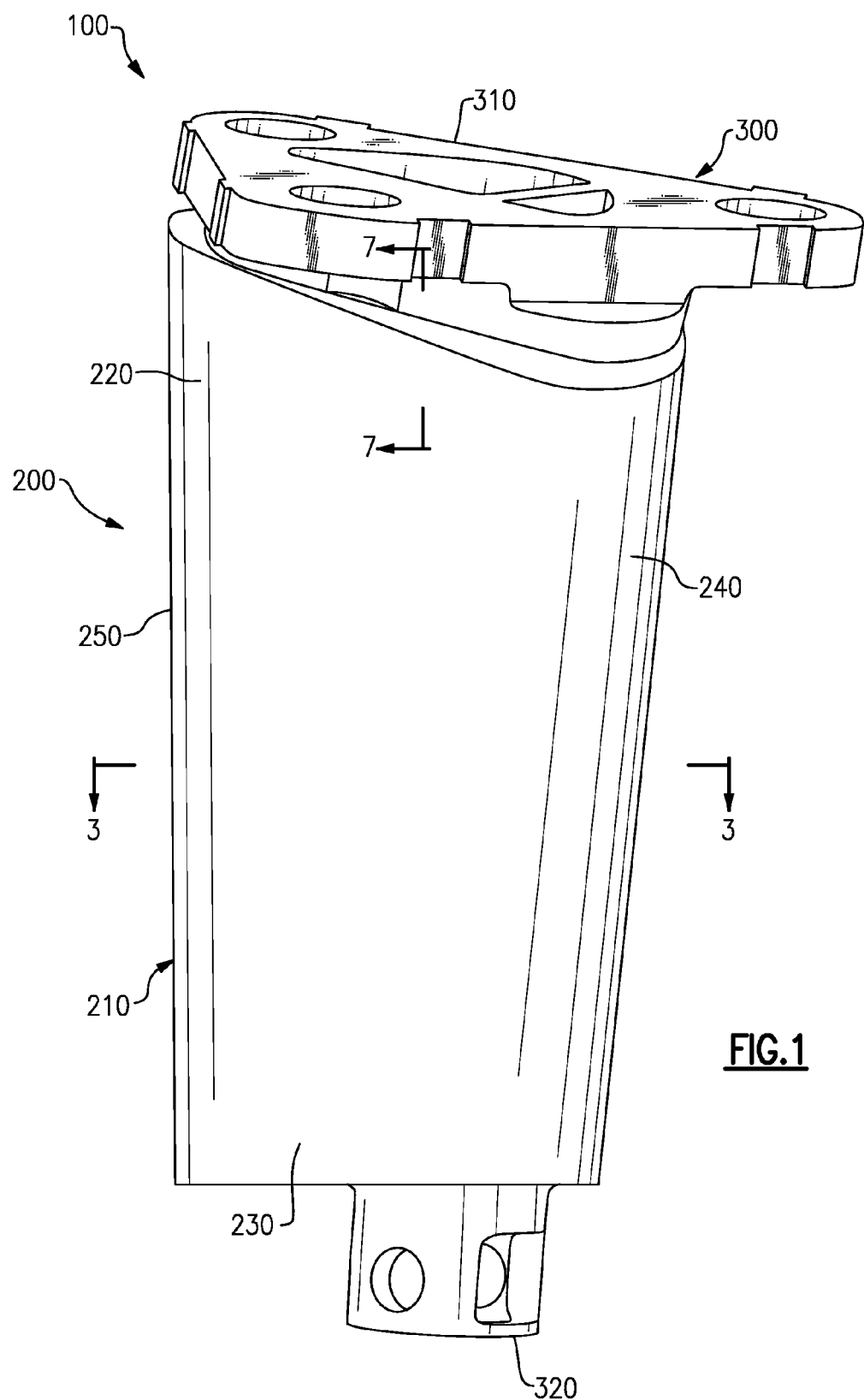
FIG. 1 is an enlarged perspective view of a turbine nozzle in accordance with aspects of the present disclosure for use in a gas turbine

FIG. 1 illustrates a nozzle 100 which may generally include a hollow airfoil body 200, a strut 300, and one or more seals in accordance with aspects of the present disclosure. For example, hollow airfoil body 200 may include an outer surface 210 defining a root section 220, a tip section 230, a leading edge 240, and a trailing edge 250. The thickness of the hollow airfoil may be about 100 mils (0.100 inch). Strut 300 may include a root support 310, and a tip support 320 operable for attaching the nozzle to the turbine.

As described in greater detail below, there is a small gap between the outer surface of the strut and an inner surface of the airfoil, which is pressurized with secondary air flow. This secondary air tries to escape from its desired region to other lower pressure regions. To reduce secondary airflow between the inside of the airfoil and the outside of the strut, a sealing element having an airfoil profile-shape is inserted between the airfoil shaped inner surface of the airfoil and a portion of the strut having an airfoil shaped outer surface.

Figure 2:
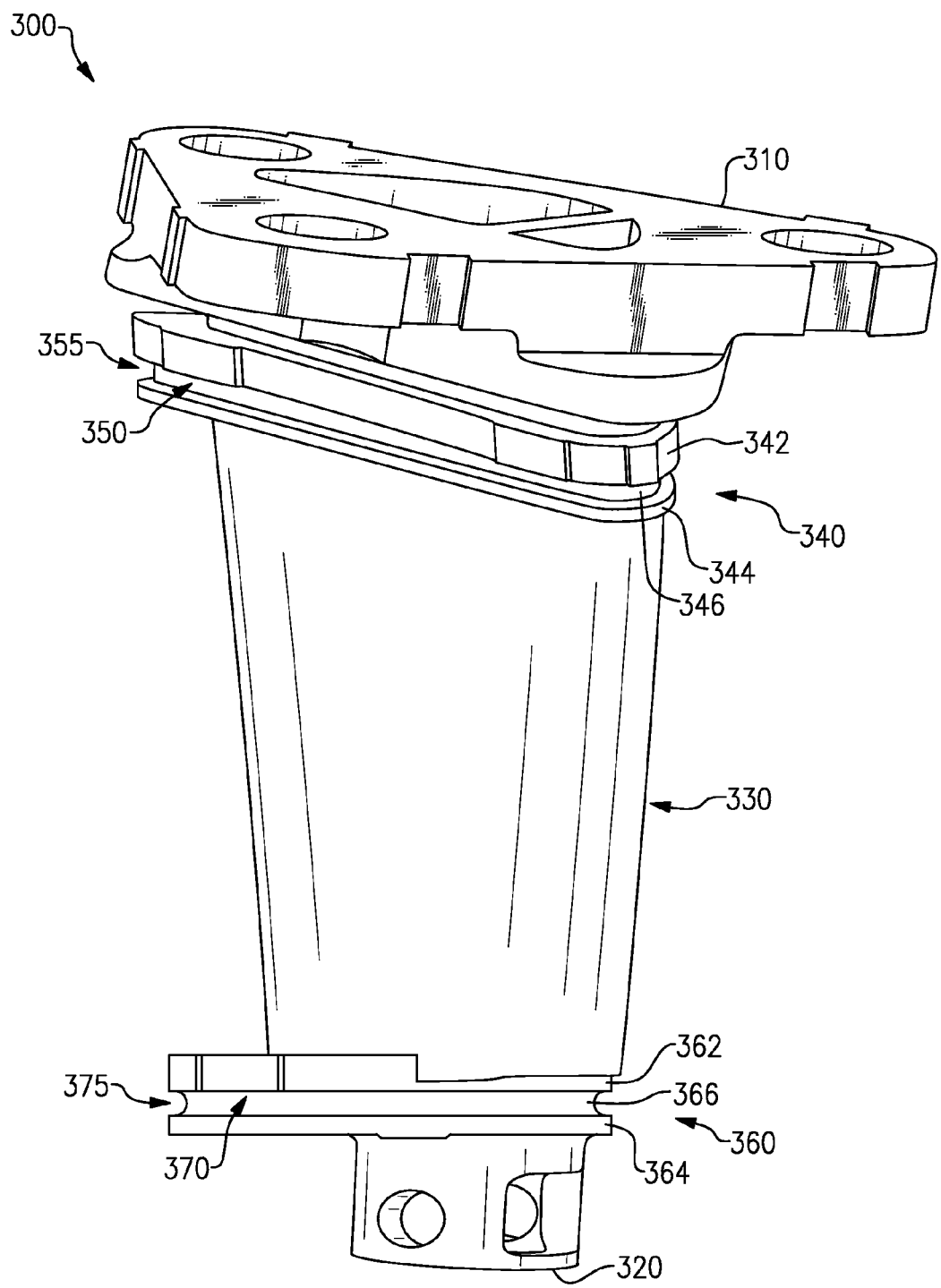
FIG. 2 is a perspective view of the strut of the turbine nozzle of FIG. 1.
Figure 3:
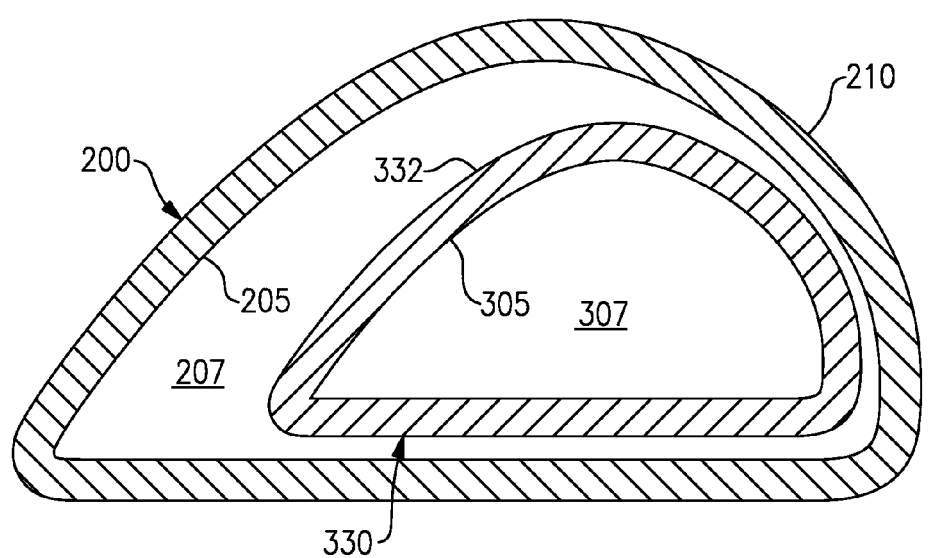
FIG. 3 is an enlarged cross-sectional view taken along line 3-3 in FIG. 1 illustrating the hollow airfoil body and the strut column.

As shown in FIG. 2 with the hollow airfoil body removed, strut 300 may include a column 330, a first or root seal support 340, and a second or tip seal support 360. With reference to FIG. 3, strut 300 is disposed in hollow airfoil body 200. For example, hollow airfoil body 200 includes outer surface 210, and an inner surface 205 defining a gap or cavity 207. In this illustrated embodiment, column 330 may be hollow having an outer surface 332, and an inner surface 305 defining a cavity 307. Column 330 may have an airfoil shape, as shown in FIG. 2, extending between root seal support 340 and tip seal support 360. Hollow airfoil body 200 and strut 300 may be generally static and not move relative to each other. It will be appreciated that the strut column may be solid, or may have other suitable shapes or configurations for supporting the hollow airfoil body.

Hollow airfoil body 200 may be formed from any suitable material, such as a ceramic, a metal alloy, or an intermetallic material. In some embodiments the hollow airfoil body may include a ceramic, for example an oxide, nitride, or carbide. Hollow airfoil body may include a silicon-containing material, such as silicon nitride, molybdenum disilicide, or silicon carbide. This material, in certain embodiments, may be a ceramic matrix composite material, such as a material made of a matrix phase and a reinforcement phase; in particular embodiments, the matrix phase and the reinforcement phase may include silicon carbide. Strut 300 may be formed from a suitable metal, metal alloy, intermetallic material, or other suitable material.

With reference again to FIG. 2, root seal support 340 may include a U-shaped configuration having a first leg 342, a second leg 344, and a bottom 366, which define a slot or groove 350 therebetween. Groove 350 may be disposed along a plane and have an airfoil profile or section shaped groove such as the groove may have a closed curve defining an external shape of a cross-section of an airfoil. As described in greater detail below, the outer edges of first leg 342 and a second leg 344 of root seal support 340 may define an opening 355 that is disposable adjacent to inner surface 205 (FIG. 3) of hollow airfoil body 200 (FIGS. 1 and 3). Tip seal support 360 may include a U-shaped configuration having a first leg 362, a second leg 364, and a bottom 346, which defines a groove 370 therebetween. Groove 370 may be disposed along a plane and have an airfoil profile or section shaped groove such as the groove may have a closed curve defining an external shape of a cross-section of an airfoil. As described in greater detail below, the outer edges of first leg 362 and a second leg 364 of tip seal support 360 may define an opening 375 that is disposable adjacent to inner surface 205 (FIG. 3) of hollow airfoil body 200 (FIGS. 1 and 3).

Figure 4:
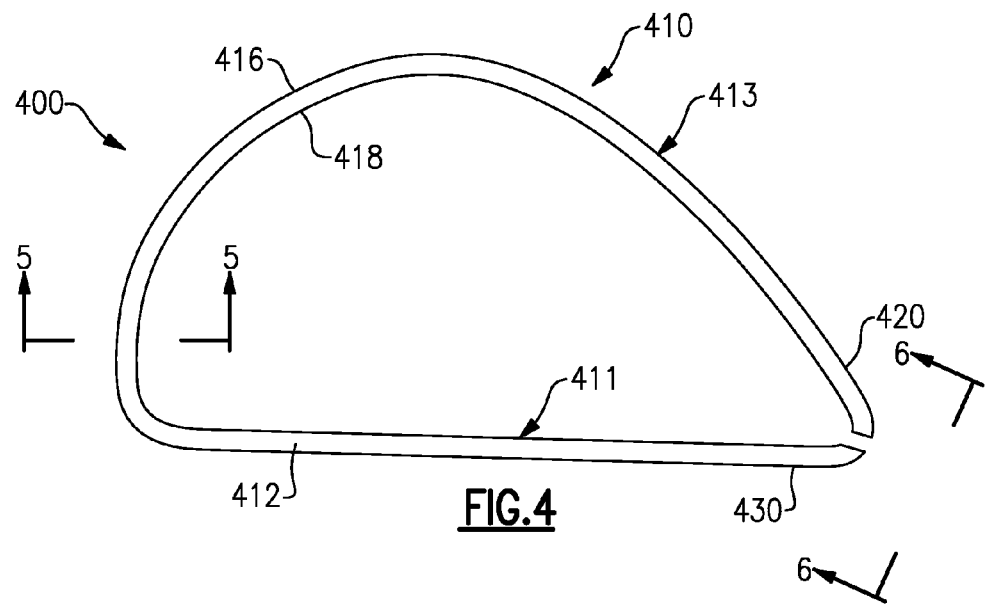
FIG. 4 is a plan view of an airfoil profile-shaped seal in accordance with aspects of the present disclosure for use in the nozzle of FIG. 1.
Figure 5:
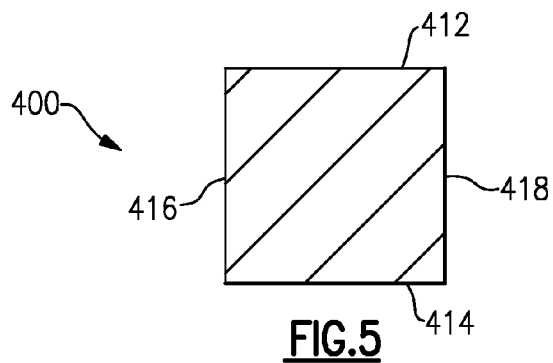
FIG. 5 is an enlarged cross-sectional view of the airfoil profile-shaped seal taken along line 5-5 in FIG. 4 illustrating the seal having a generally square configuration.
Figure 6:
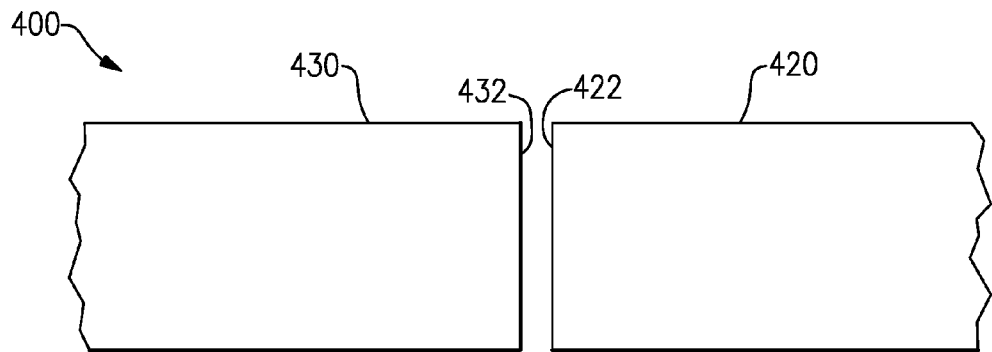
FIG. 6 is an enlarged side view of the seal taken in the direction of arrows 6-6 in FIG. 4.

FIGS. 4-6 illustrate one embodiment of an airfoil profile-shaped seal 400 in accordance with aspects of the present disclosure. Airfoil profile-shaped seal 400 is disposable in groove 350 (FIGS. 2) and 370 (FIG. 2) of strut 300 (FIG. 2). As shown in FIG. 4, seal 400 may include a monolithic or one-piece elongated member 410 having a generally straight elongated portion 411 and a generally curved elongated portion 513 disposed along a plane having an airfoil profile or section shaped configuration such that the seal may have a generally closed curve defining an external shape of a cross-section of an airfoil. Elongated member 410 may have a first end 420, and a second end 430 disposed adjacent to first end 420. For example, edge 422 of first end 420 may be disposed adjacent to edge 432 of second end 430 as shown in FIG. 6. The spacing between the ends may be between about 10 mils (0.010 inch) and about 20 mils (0.020 inch). Seal 400 may have a generally rigid structure, and as shown in FIG. 5, seal 400 may have a solid cross-section. For example, elongated member 410 may have a longitudinal axis and a generally solid square cross-section extending along the length of the longitudinal axis. As shown in FIGS.

4 and 5, elongated member 410 may include a top surface 412, a bottom surface 414 (FIG. 5), an outer surface 416, and an inner surface 418.

Figure 7:
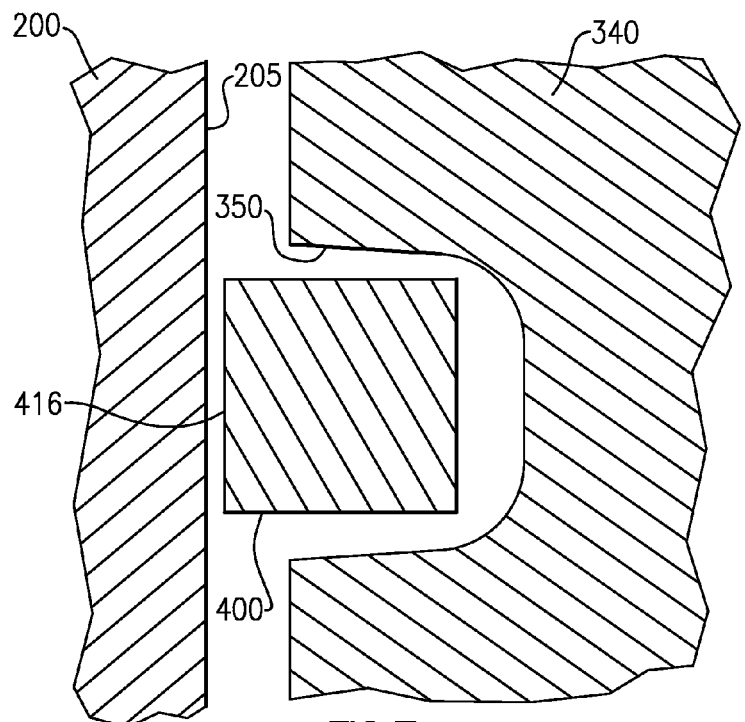
FIG. 7 is an enlarged cross-sectional view taken along lines 7-7 in FIG. 1 illustrating assembled portions the airfoil profile-shaped seal, hollow airfoil body, and the root support.
Figure 8:
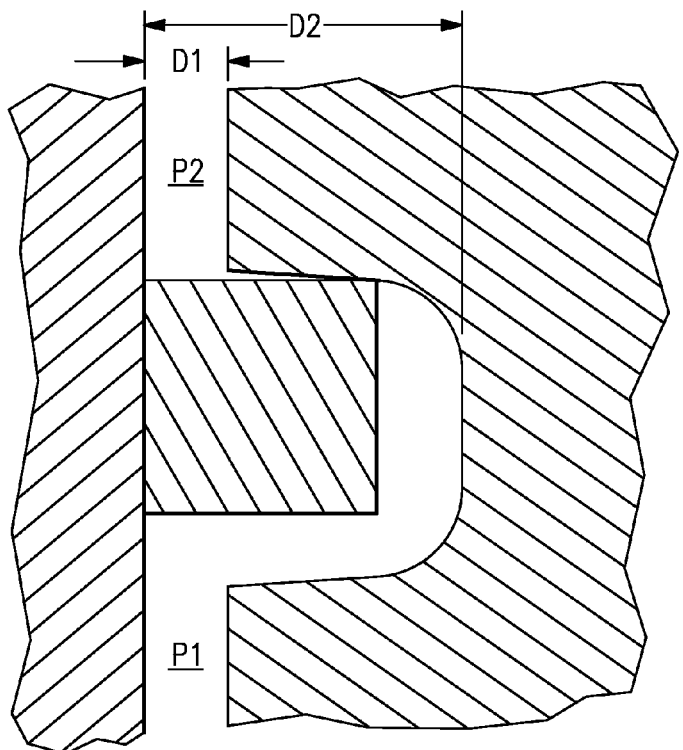
FIG. 8 is a cross-sectional view similar to FIG. 7 in which a pressure differential is disposed across the airfoil profile-shaped seal.

With reference to FIG. 7, when assembled, seal 400 may be disposed in groove 350 of root seal support 340 between root seal support 340 and inner surface 205 of hollow airfoil body 200. For example, hollow airfoil body 200 and root seal support 340 may be generally static and generally not move relative to each other. It will be appreciated that the hollow airfoil body and the root seal support may move relative to each other, for example, due to differences in thermal expansion. Outer surfaces of seal 400 may be generally loosely disposed in grove 350, e.g., generally spaced apart from the surfaces of root seal support 340 defining groove 350 and spaced apart from inner surface 205 of hollow airfoil body 200. Outer flat surface 416 may be disposed and facing inner surface 205 of hollow airfoil body 200. For example, outer flat surface 416 may be disposed parallel with inner surface 205 of hollow airfoil body 200. As shown in FIG. 8, when a fluid pressure P1 on one side of seal 400 is greater than a fluid pressure P2 on the other side of seal 400, seal 400 may be pushed or forced against and engage or abut a portion of inner surface 205 of hollow airfoil body 200 and groove 350 to form a seal to inhibit leakage of fluid from one side of the seal to the other side of the seal. For example, the seal may push against a curved closed boundary around the inside of inner airfoil thereby forming a tight interface that inhibits leakage of fluid across the seal.

Figure 9:
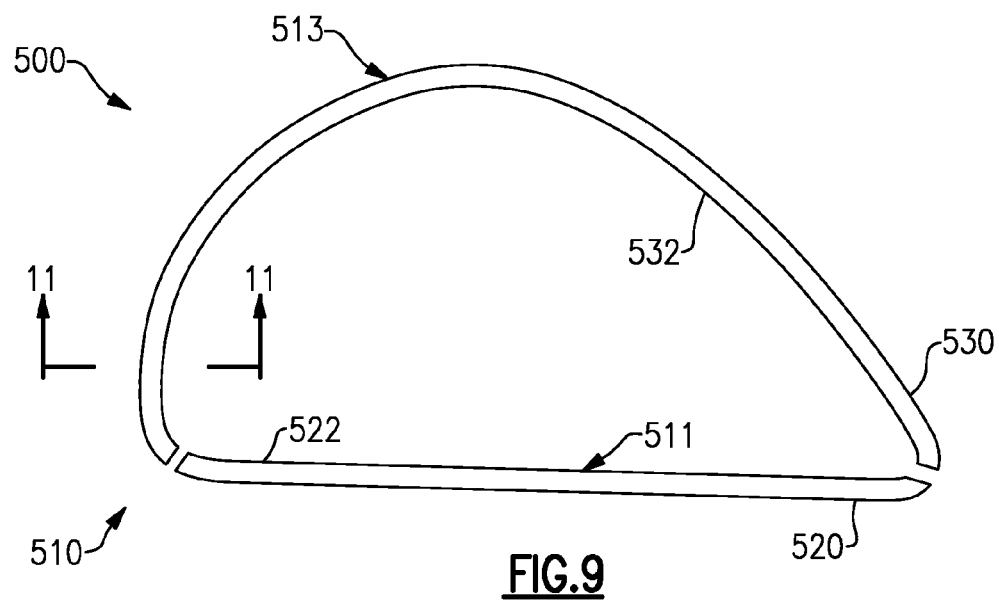
FIG. 9 is a plan view of an airfoil profile-shaped seal in accordance with aspects of the present disclosure for use in the nozzle of FIG. 1.

FIG. 9 illustrates an airfoil profile-shaped seal 500 in accordance with aspects of the present disclosure disposable in groove 350 (FIG. 2) and 370 (FIG. 2) of strut 300 (FIG. 2). As shown in FIG. 9, seal 500 may include a two-piece elongated member 510 having a generally straight elongated portion 511 and a generally curved elongated portion 513 disposed along a plane and together having an airfoil profile or section shaped configuration such that the seal may include a generally closed curve defining an external shape of a cross-section of an airfoil. Straight elongated portion 511 includes a first end 520, and a second end 522. Curved elongated portion 513 includes a first end 530 disposed adjacent to first end 520 of straight elongated portion 511, and a second end 532 disposed adjacent to second end 522 of straight elongated portion 511. Seal 500 may have a generally rigid structure, and seal 500 may have a solid cross-section. For example, elongated member 510 may have a longitudinal axis and a generally constant solid square cross-section along the longitudinal axis.

Figure 10:
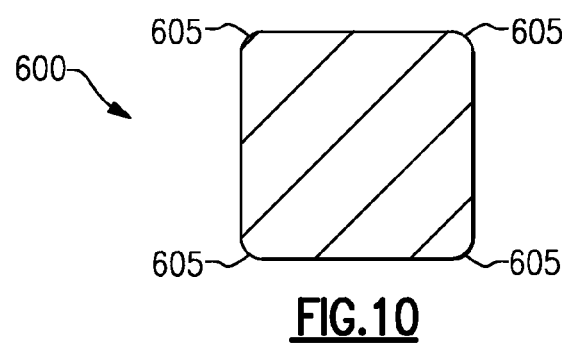
FIG. 10 is an enlarged cross-sectional view of the airfoil profile-shaped seal taken along line 10-10 in FIG. 9 illustrating the seal having a generally square configuration with rounded corners.
Figure 11:
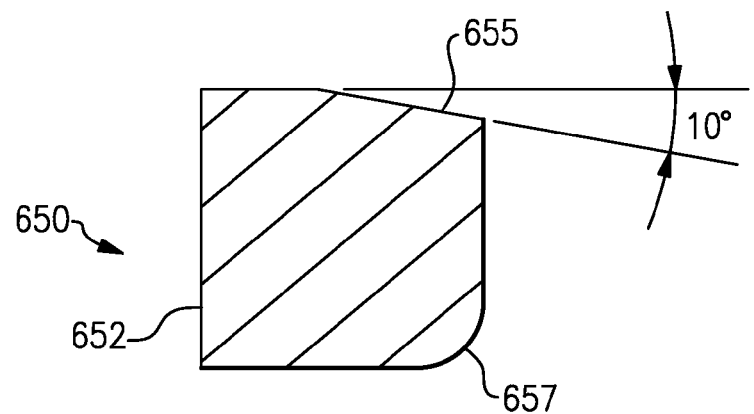
FIG. 11 is a cross-sectional view of an airfoil profile-shaped seal in accordance with aspects of the present disclosure for use in the nozzle of FIG. 1.
Figure 12:
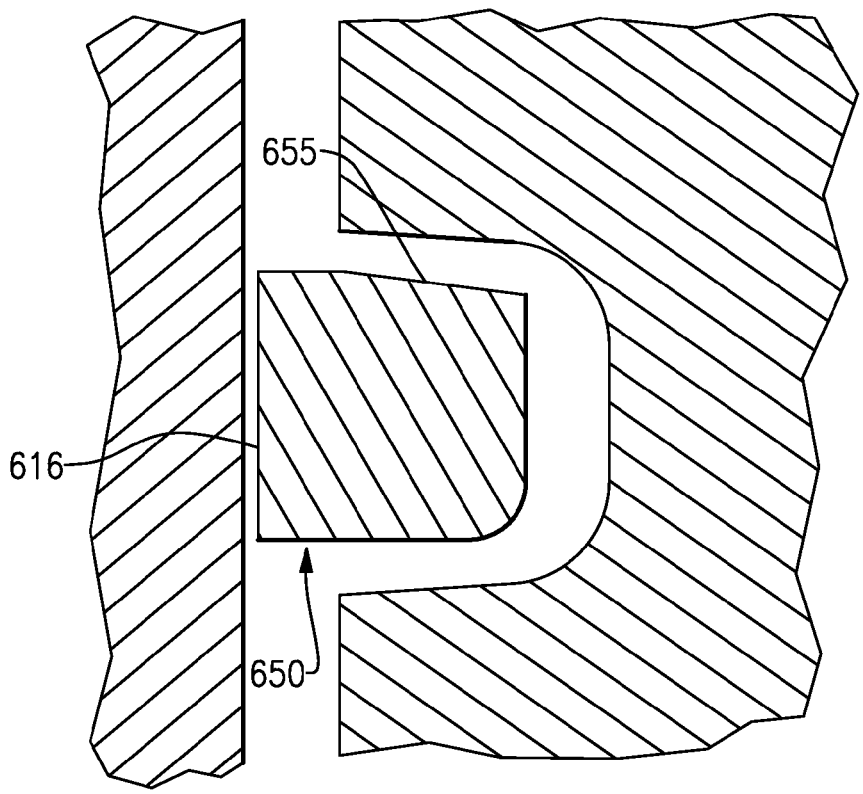
FIG. 12 is a cross-sectional view illustrating assembled portions the airfoil profile-shaped seal of FIG. 11, a hollow airfoil body, and a support.

As shown in FIG. 10, an airfoil profile-shaped seal 600 may include one or more elongated members having a longitudinal axis and a generally solid square cross-section with rounded corners 605 along the longitudinal axis. As shown in FIG. 11, a seal 650 may include one or more elongated members having a generally non-symmetric cross-section about a longitudinal axis. For example, seal 650 may include a generally solid square cross-section with a draft 655 and a rounded corner 657 along the length of the longitudinal axis. For example, as shown in FIG. 12, an outer surface 616 of seal 650 may be disposed toward and engage an inner surface portion of a hollow airfoil body, and a draft 655 may be disposed toward a side of the seal support. In this configuration, seal 650 may result in a greater surface area of the seal engaging the inner surface of the hollow airfoil body and the seal support, and may result in further reducing the leakage of pressurized fluid from the lower side of the seal support to the upper side of the seal support compared to if of only the one or more of the corners engages the inner surface of the hollow airfoil body and the seal support.

Figure 13:
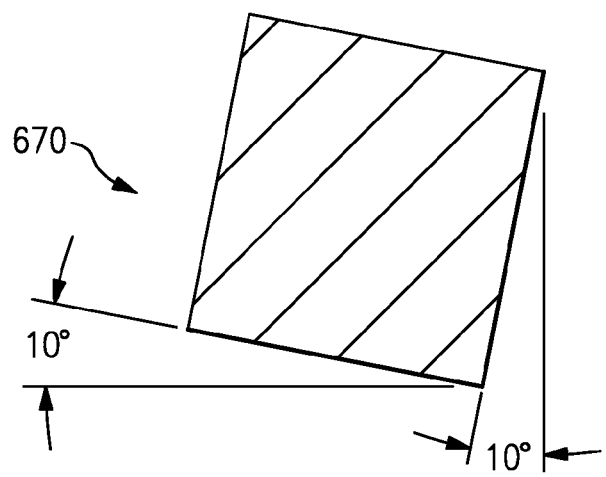
FIG. 13 is a cross-sectional view of an airfoil profile-shaped seal in accordance with aspects of the present disclosure for use in the nozzle of FIG. 1.
Figure 14:
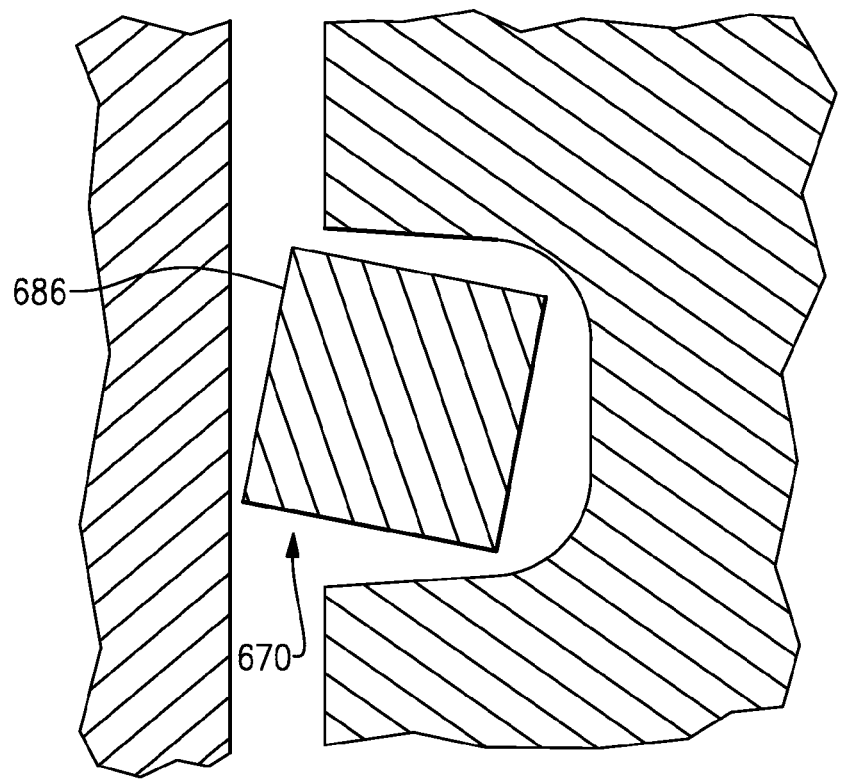
FIG. 14 is a cross-sectional view illustrating assembled portions the airfoil profile-shaped seal of FIG. 13, a hollow airfoil body, and a support.

As shown in FIG. 13, an airfoil profile-shaped seal 670 may include one or more elongated members having a longitudinal axis that extends around a groove in a seal support. Seal 670 may include a generally square cross-section have a tilted geometry relative to a plan of the airfoil profile-shaped seal. For example, the square cross-section may be tilted about 10 degrees from vertical and horizontal reference lines. As shown in FIG. 14, one of the corners of seal 670 may be disposed toward and engage an inner surface of a hollow airfoil body, two of the other corners may engage surfaces of the seal support, and a portion of the side of the seal may engage the seal support along the opening. In this configuration, seal 670 may result in a greater number of contact portions of the seal engaging the inner surface of the hollow airfoil body and the seal support.

Figure 15:
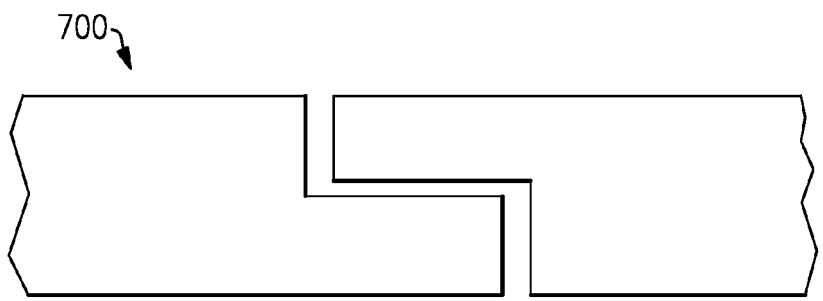
FIG. 15 is a side view of the ends of an airfoil profile-shaped seal having overlapping portions in accordance with aspects of the present disclosure for use in the nozzle of FIG. 1.
Figure 16:
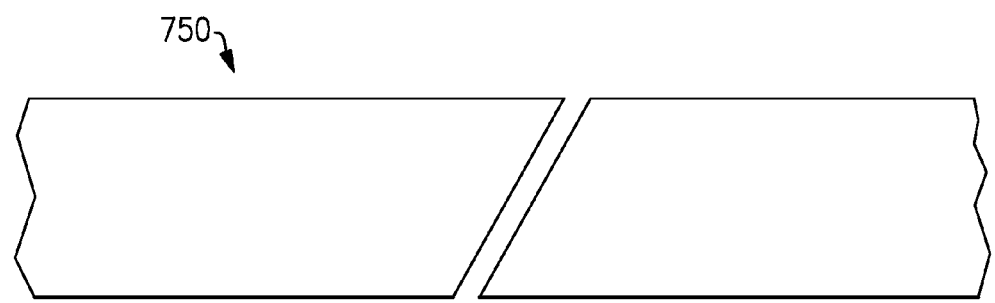
FIG. 16 is a side view of the ends of an airfoil profile-shaped seal having overlapping portions in accordance with aspects of the present disclosure for use in the nozzle of FIG. 1.

FIGS. 15 and 16 illustrate airfoil profile-shaped seals 700 and 750 in accordance with aspects of the present disclosure. For example, airfoil profile-shaped seal 700 may have lap joints, wherein one portion of the seal sits or rest on top of the other. Airfoil profile-shaped seal 750 may have scarp joints, wherein the seal has mating surfaces disposed on an angle relative to the plane of the seal.

From the present description, it will be appreciated that the shape and size of the groove and the shape and size of the airfoil profile-shaped seal may vary depending on the application. The groove may be any a groove, indent, or slot that extends at least partially into the seal support. As used herein, the terms "groove" "indent", "slot", and are meant to be interchangeable and encompass or include any channel, crevice, notch, or indent defined in a seal support.

The airfoil profile-shaped seal may be made of a metal or other suitable material. For example, the airfoil profile-shaped seal may be fabricated from a plate of HAYNES® 188 alloy, a cobalt-nickel-chromium-tungsten alloy designed for high temperature strength and resistance to oxidation at temperatures up to 2,000 degrees Fahrenheit (1,095 degrees Celsius). For example, the plate may be formed in to airfoil profile-shaped seal the using an electro-discharge machining process or other suitable process. It will be appreciated that the airfoil profile-shaped seal may be fabricated from other suitable material. The contour of the outer surface of the airfoil profile-shaped seal may be conform to or closely match the contour of the inner surface of the hollow airfoil body to provide surface area contact between the groove, seal, and hollow airfoil body. For example, the gap between the contour of the outer surface of the airfoil profile-shaped seal and the contour of the inner surface of the hollow airfoil body may be between about +/−5 mils (0.005 inch) and about +/−10 mils (0.010 inch).

The airfoil profile-shaped seal may generally have a cross-sectional width and a height of between about 40 mils (0.040 inch) and about 60 mils (0.060 inch), and may be about 50 mils (0.050). As shown in FIG. 8, the inside of the hollow airfoil body may be spaced apart a distance D1 between about 20 mils (0.020 inch) and about 30 mils (0.030 inch) from the outré surface of the support. The inside of the hollow airfoil body may be spaced apart a distance D2 between about 70 mils (0.070 inch) and about 80 mils (0.080 inch) from the bottom of the groove. The groove may have a cross-sectional width and a height between about 70 mils (0.070 inch) and about 80 mils (0.080 inch).

The height and width, and length of the seal may be a function of the size of groove to form an effective seal, as well as size and function of the turbine components, the acceptable gap tolerances, the location within a gas turbine of the turbine components, the operational parameters of the gas turbine, etc. Accordingly, the height and width and length of the seal may vary, and the sealing element may be configured in various ways within the scope of the disclosure to suit a particular purpose, grove, slot and/or gap.

From the present description, it will be appreciated that the technique of the present disclosure may reduce the likelihood of leakage flow between two airfoils shaped structures. The seal element is configured such that its cross-section resembles that of an airfoil profile shape. For example, the technique of the present disclosure may aid in reducing leakage of secondary flow in an aircraft engine. Reduced leakage in secondary flow may leads to more efficient operation of the turbine, and may leading to lesser cost in fuel burn for achieving the same amount of work.

Figure 17:
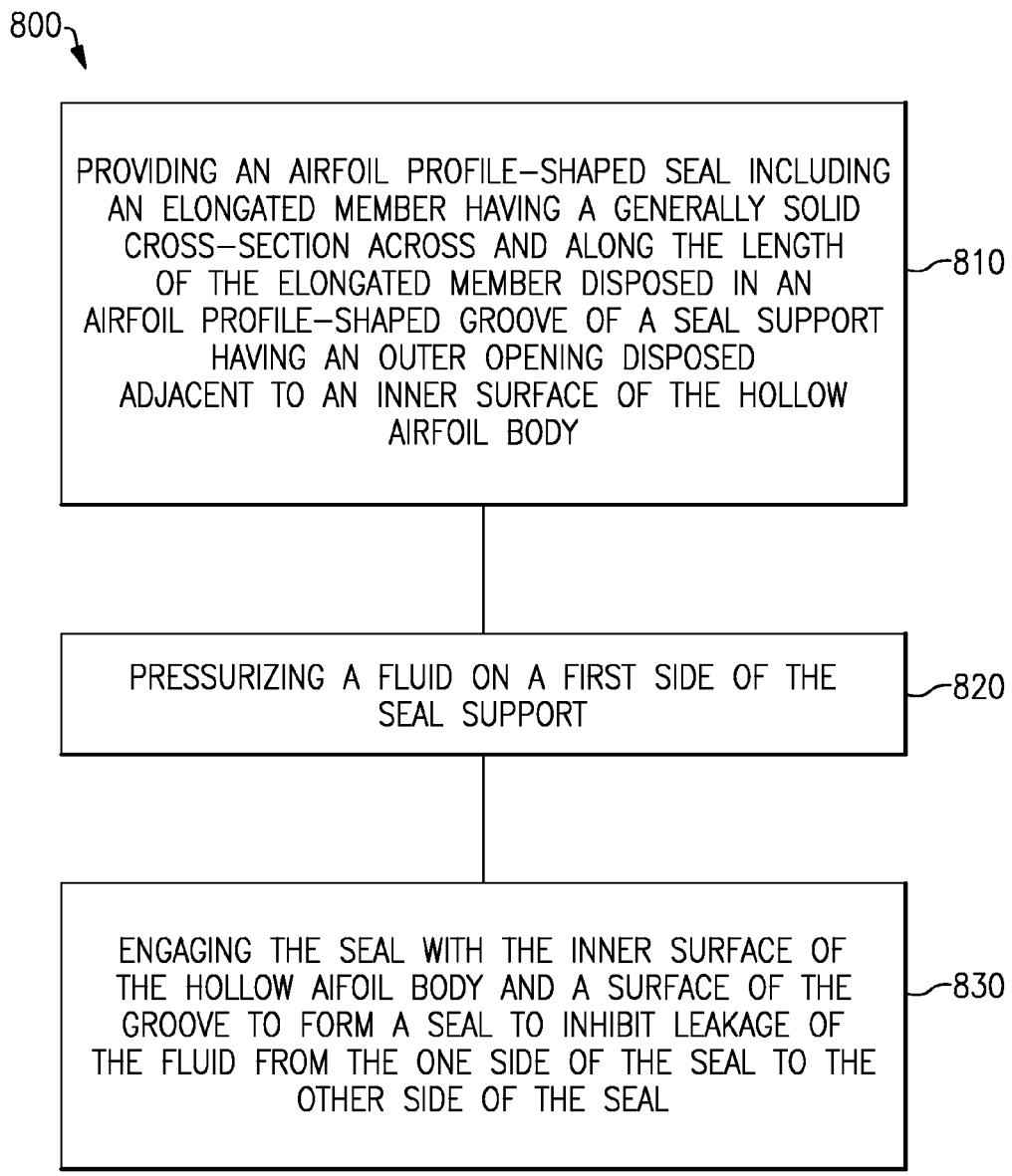
FIG. 17 is a flowchart of a method for sealing a hollow airfoil body to a strut of a turbine in accordance with aspects of the present disclosure.

With reference to FIG. 17, a method 800 for sealing a hollow airfoil body to a strut of a turbine included at 810, providing an airfoil profile-shaped seal including an elongated member having a generally solid cross-section across and along the length of the elongated member disposed in an airfoil profile-shaped groove of the seal support having an outer opening disposed adjacent to an inner surface of the hollow airfoil body, at 820, pressurizing a fluid on a first side of the seal support, and at 830, engaging the seal with the inner surface of the hollow airfoil body to form a seal to inhibit leakage of the fluid from the one side of the seal to the other side of the seal.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An article comprising:
a hollow airfoil body having an outer surface and an inner surface defining a cavity therein;
at least one seal support having an airfoil profile-shaped groove with an outer opening disposed in said cavity adjacent to said inner surface of said hollow airfoil body;
an airfoil profile-shaped seal disposed in said groove of said seal support, said seal comprising an elongated member defining a generally closed curve having a generally straight portion, a generally curved portion, and having a solid cross-section across and along the length of said elongated member; and
wherein when a fluid pressure on one side of said seal is greater than a fluid pressure on the other side of said seal, portions of said seal engage said inner surface of said hollow airfoil body to form a seal to inhibit leakage of fluid from said one side to said other side.

2. The article of claim 1 wherein said seal comprises an outer surface engageable with said inner surface of said hollow airfoil body, and said outer surface being parallel to an engaging portion of said inner surface of said hollow airfoil body.

3. The article of claim 1 wherein said seal comprises a generally constant solid cross-section across and along the length of said elongated member.

4. The article of claim 1 wherein said seal comprises a generally constant solid square cross-section across and along the length of said elongated member.

5. The article of claim 4, wherein a top surface of the elongated member has a draft and a bottom surface has a rounded corner.

6. The article of claim 5, wherein the draft is 10°.

7. The article of claim 1 wherein said seal comprises a generally constant solid square cross-section with rounded corners across and along the length of said elongated member.

8. The article of claim 1 wherein said seal comprises a generally constant non-symmetric cross-section about a longitudinal axis and along the length of said elongated member.

9. The article of claim 1 wherein said seal comprises a width and a height of 0.050 inch.

10. The article of claim 1 wherein said seal comprises an elongated monolithic one-piece member having a first end and a second end, and wherein the first and second ends are disposed adjacent to each other.

11. The article of claim 1 wherein said seal comprises an elongated member comprising a plurality of monolithic one-piece elongated sections arranged end to end.

12. The article of claim 1 wherein said seal comprises at least one elongated member comprising a first end and a second end, and wherein at least a portion of said first end overlaps a portion of said second end.

13. The article of claim 1 wherein said cross-section of said seal is smaller than a cross-section of said groove.

14. The article of claim 1 wherein said seal comprises an elongated member defining the generally closed curve disposed in a plane.

15. The article of claim 14 wherein said seal comprises a generally constant solid square cross-section rotated on an angle relative to said plane of said seal.

16. The article of claim 1 further comprising a strut disposed in said cavity of said hollow airfoil body, and said strut comprising said at least one seal support.

17. The article of claim 1 wherein said hollow airfoil body comprises a generally constant thickness between said outer airfoil surface and said inner airfoil surface.

18. The article of claim 1 wherein:
said outer surface of said hollow airfoil body defines a root section, a tip section, a leading edge, and a trailing edge;
said at least one seal support comprises a first seal support having a first airfoil profile-shaped groove having a first outer opening disposed adjacent to said root section of said inner surface of said hollow airfoil body, and a second seal support having a second airfoil profile-shaped groove having a second outer opening disposed adjacent to said tip section of said inner surface of said hollow airfoil body; and
said at least one airfoil profile-shaped seal comprising a first airfoil profile-shaped seal disposed in said first groove of said first seal support, and a second airfoil profile-shaped seal disposed in said second groove of said second seal support.

19. The article of claim 1 wherein:
said hollow airfoil body comprises a ceramic composite material; and
said at least one seal support comprises metal.

20. The article of claim 1 wherein said article comprises a nozzle of a turbine.

21. The article of claim 1, wherein the elongated member is rigid.

22. An airfoil profile-shaped seal disposable between an inside surface of a hollow airfoil body and a seal support, said seal comprising:
an elongated rigid member defining a generally closed curve having a generally straight portion, a generally curved portion, and having a solid cross-section across and along the length of said elongated member, the elongated rigid member being formed of a cobalt alloy; and
wherein when said seal is disposed in an airfoil profile-shaped groove of a seal support adjacent to the inner surface of the hollow airfoil body, and a fluid pressure on one side of said seal is greater than a fluid pressurize on the other side of said seal, portions of said seal engage the inner surface of the hollow airfoil body and a surface of said groove to form a seal to inhibit leakage of fluid from said one side to said other side.

23. The airfoil profile-shaped seal of claim 22, wherein the elongated rigid member is formed of a cobalt-nickel-chromium-tungsten alloy.

* * * * *